United States Patent [19]

Armstrong

[11] 4,248,446
[45] Feb. 3, 1981

[54] SLOPEMOBILE VEHICLE

[76] Inventor: W. Ted Armstrong, 388 - 43rd St., Oakland, Calif. 94609

[21] Appl. No.: 951,351

[22] Filed: Oct. 13, 1978

[51] Int. Cl.³ .............................................. B62K 17/00
[52] U.S. Cl. ................................ 280/87.01; 280/6 R; 280/28.5; 280/43.16
[58] Field of Search ...................... 280/11.37 R, 11.39, 280/39, 40, 43.15, 43.16, 87.01, 87.02, 87.03, 79.2, 28.5, 6 R

[56] References Cited

U.S. PATENT DOCUMENTS

| 380,335 | 4/1888 | Loree | 280/43.16 |
| 1,371,421 | 3/1921 | Hoffman | 280/87.02 R |
| 1,372,623 | 3/1921 | Klenke | 280/87.03 |
| 1,448,124 | 3/1923 | Kilgour | 280/87.02 R |
| 4,122,901 | 10/1978 | Koepplin | 171/61 |

FOREIGN PATENT DOCUMENTS 51253  6/1918  Fed. Rep. of Germany ........ 280/11.39

Primary Examiner—David M. Mitchell

[57] ABSTRACT

This vehicle enables a person to safely descend slopes of varying grades, and it consists primarily of a frame, having a forward tube, which is spring-loaded, and pivotally secured to a tractor pod, which grippingly engages the ground surface. It further includes a wheel supported rear portion, having a seat with a strap, and the vehicle is adjustable by a loop of cable.

3 Claims, 3 Drawing Figures

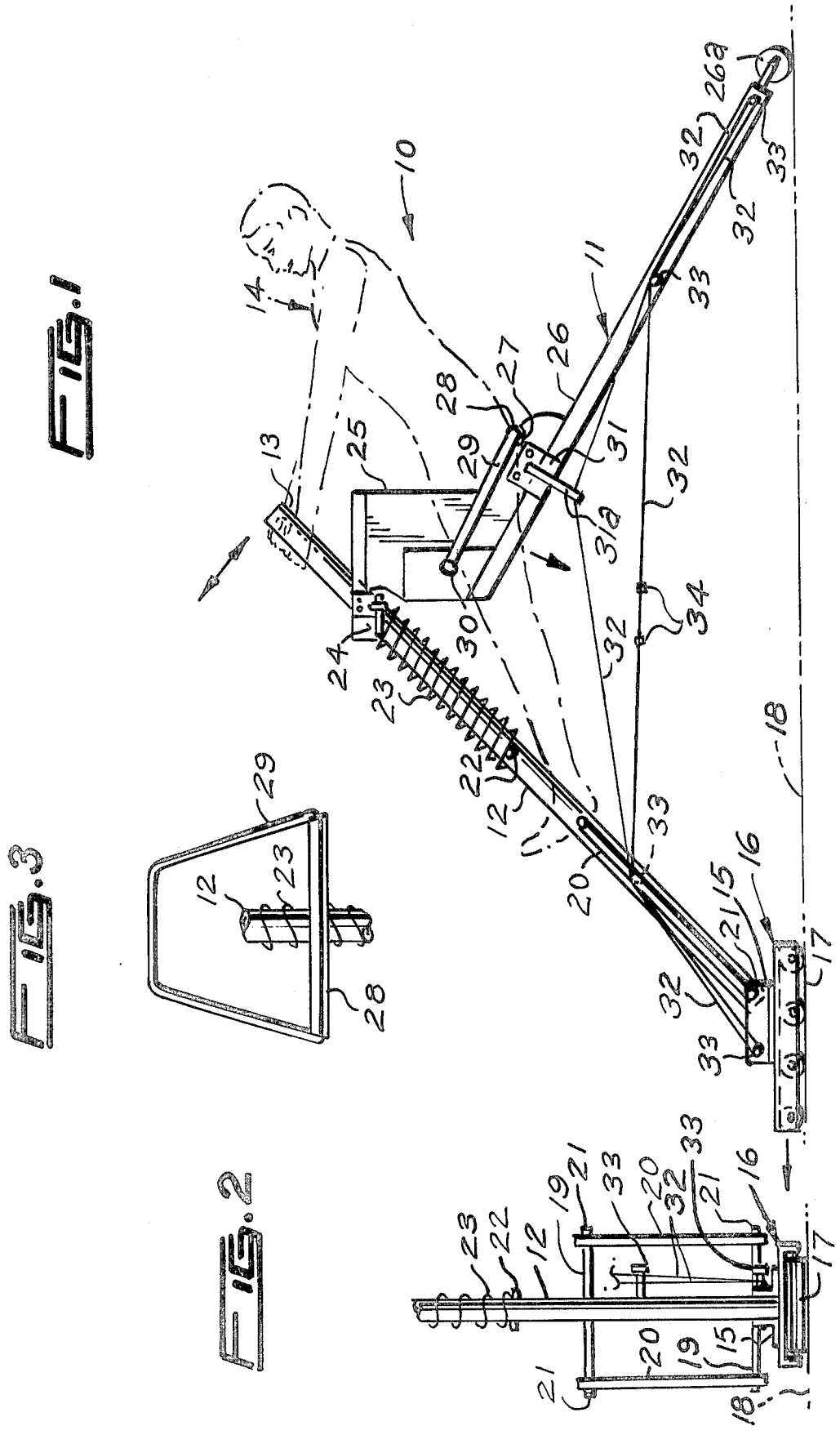

SLOPEMOBILE VEHICLE

This invention relates to vehicles, and more particularly, to a slope vehicle.

It is therefore, the primary object of this invention to provide a slopemobile vehicle, which will enable a rider to descend a slope safely.

Another object of this invention is to provide a slopemobile vehicle, which will be manually operated by the rider, in descending a slope.

A further object of this invention is to provide a slopemobile vehicle, which will be adjustable by cable means, so as to enable the rider to descend slopes of various grades.

Other objects of the invention are to provide a slopemobile vehicle, which will be simple in design, inexpensive to manufacture, rugged in construction, and stable in use.

These, and other objects of the invention, will become readily evident, upon a study of the specification, and the accompanying drawing, wherein:

FIG. 1 is a side view of the present invention, and illustrates a rider in phantom lines;

FIG. 2 is a fragmentary front view of FIG. 1, and

FIG. 3 is an enlarged fragmentary plan view of FIG. 1, showing the seat bar and belt of the invention.

According to this invention, a vehicle 10 is shown to include a frame 11, the forward portion having a tube 12, of which the upper end 13 serves as a handle grip for the rider 14. On the opposite end is secured a pair of spaced apart "L"-shaped brackets 15, which are fixedly secured to the top of a tractor pod 16. The endless tread 17, of pod 16, serves as positive traction means, on the ground 18, for vehicle 10, when it is descending a slope.

A pair of bars 19 are spaced apart, and extend transversely through the tube 12. Bars 19 are fixedly secured to tube 12, in a suitable manner, and are fastened to a pair of stabilizer bars 20, by means of suitable fasteners 21. A transverse pin 22 is fixedly secured in tube 12, so as to serve as stop means for the lower end of a coil spring 23, and the upper end of spring 23 is retained by means of bracket 24, which is fixedly secured to plate 25.

It shall be noted, that the upper bar 19, of tube 12, serves as foot rest means for the rider 14.

An elongated bar or tube 26 includes a freely rotatable wheel 26a, at one end, for rolling engagement with the ground 18, and the opposite end is fixedly secured to the bottom of plate 25. A recess 27, in plate 25, removably receives a bar 28, which provides seat means for the rider 14, and belt 29 is fixedly secured, at each end, to bar 28. Belt 29 is freely received in opening 30 of plate 25. A bracket 31 is fixedly secured to a side of bar 26, and a guide member 31a is fixedly secured to bracket 31, for supporting a loop of cable 32, which is strung on a plurality of pins 33, that are fixedly secured to a bracket 15, tube 12, and bar or tube 26. A pair of adjustable fasteners 34, in cable 32, enables spreading of tube 12 to and from tube 26, for the weight of the rider to be shifted to the front or back of the slope, so as to adapt vehicle 10 to various slope angles.

It shall also be noted, that spring 23 serves as shock-absorbing means for vehicle 10.

While various changes may be made in the detail construction, such changes will be within the spirit and scope of the present invention, as is defined by the appended claims.

What I now claim is:

1. A slopemobile vehicle, comprising, in combination, an angularly disposed front tube, a coil spring received on the upper portion of the outer periphery of said angularly disposed front tube, providing shock absorbing means for the rider, and simultaneously enabling up and down movement of a vertical plate secured fixedly, at one end, to a bracket freely received on said angularly disposed front tube, the opposite end of said vertical plate being fixedly secured to the forward end of an angularly disposed rear tube, a tractor pod pivotally secured, by a pair of transversely spaced-apart brackets, to the lower end of said angularly disposed front tube, said tractor pod providing lateral stability and preventing lateral slippage of said vehicle, said tractor pod comprising an endless tread in rolling engagement with a slope surface, and a horizontal bar, freely received in said vertical plate, providing seat support means for the rider, a pair of spaced-apart rods secured fixedly and transversely, to the lower portion of said angularly disposed front tube, the uppermost rod providing foot rest means for the rider, and a stabilizer rod is secured fixedly, at each end, to the ends of each of said pair of spaced-apart rods, by suitable fastener means.

2. The combination according to claim 1, wherein a lowermost rod of said pair of rods is pivotally secured within said spaced-apart brackets, and a transverse pin is fixedly secured in said angularly disposed front tube, above said uppermost rod, and said coil spring abuts, at one end, with said transverse pin, and the opposite end of said coil spring abuts with said bracket freely received on said angularly disposed front tube, and a wheel is freely and rotatably received on the lower end of said angularly disposed rear tube, for engagement with a slop surface, and said vertical plate includes an opening, through which is freely received a flexible belt, that is fixedly secured, at each end, to the ends of said horizontal bar, which comprises seat means for the rider, and said flexible belt is secured around the rider's legs, and said horizontal bar is removably received in a recess in the upper rearward surface of said vertical plate, and a guide bracket is fixedly secured to said vertical plate by suitable fasteners, for freely receiving and retaining a loop of cable connected between the front and rear tubes, for adjusting the distance between the lower ends of said angularly disposed front tube and said angularly disposed rear tube.

3. The combination, according to claim 2, wherein a pin is fixedly secured to the side of the lowermost end of said angularly disposed rear tube, for receiving one end of said loop of cable, a second pin is fixedly secured to the side of said angularly disposed rear tube, between said guide bracket and said lowermost end of said angularly disposed rear tube, for supporting said loop of cable in a safe and spaced relationship with a slope surface, a similar pin is fixedly secured to the side of said angularly disposed front tube for supporting said loop of cable in a safe and spaced relationship with the slope surface, and a pin is fixedly secured to one side of one of said brackets of said tractor pod, and retains the opposite end of said loop of cable, and a pair of adjustable fasteners, on said loop of cable, enables said loop of cable to be shortened or lengthened, so as to urge said angularly disposed front tube and said angularly disposed rear tube together, or apart, for adapting said vehicle to slope surfaces of varying degrees.

* * * * *